INVENTORS
CHARLES I. JACKSON
DAVID P. HACKER
BY

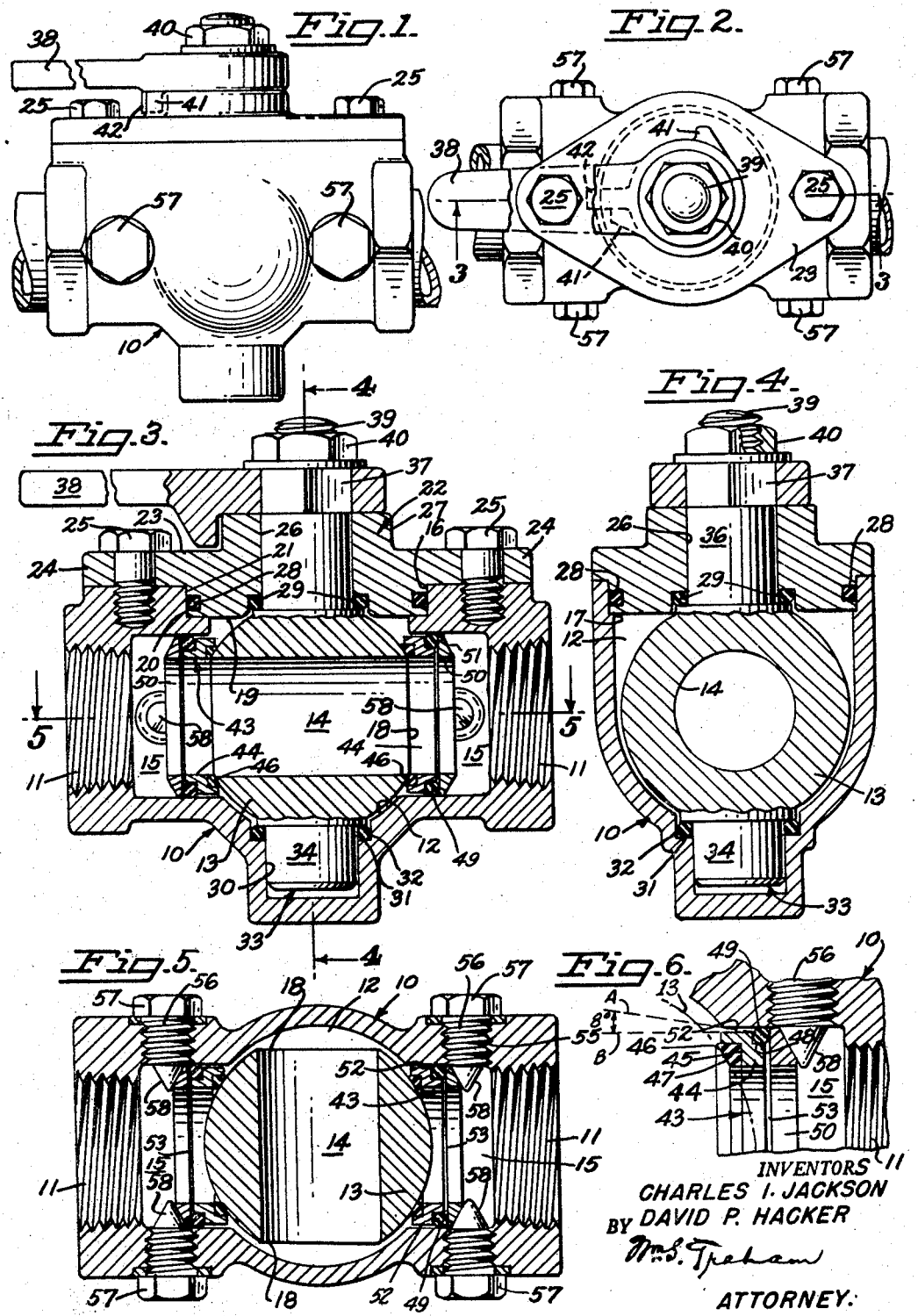

ATTORNEY.

United States Patent Office

3,037,738
Patented June 5, 1962

3,037,738
ROTOR VALVE
Charles I. Jackson, 666 Burrows St., San Bruno, Calif., and David P. Hacker, Berkeley, Calif. (236 Clara St., San Francisco 7, Calif.)
Filed Mar. 11, 1960, Ser. No. 14,302
7 Claims. (Cl. 251—172)

This invention relates generally to rotor valves for fluid flow lines and more particularly relates to such valves having a spherical rotor plug and an adjustable or floating resiliently supported valve seat in the flow line.

This application is a continuation in part of our previously filed application Ser. No. 731,171 filed April 28, 1958, now abandoned, for Rotor Valve.

Briefly described the invention comprises a hollow housing having inlet and outlet ports and a closeable opening in its wall through which all operating parts of the valve may be installed or removed. The spigot or plug of the valve is a truncated spherical rotor having the usual flow opening therethrough, the rotor being integral with a diametrical shaft by means of which the spherical rotor is rotatable upon the axis of the shaft. There are seats for the spherical rotor plug both upstream and downstream, the seats being floating or rockable and adjustable on its axis by suitable resilient means, such as suitable sealing rings preferably of the O-ring type.

Among the objects of the invention are to provide a spherical rotor valve providing a sealing seat both upstream and downstream; to provide in such a valve for resilient oscillation and adjustability of such seats; to provide for installation and removal of all internal operating parts of the valve through a single opening, and generally to improve upon valves of the character described.

With the foregoing and other objects in view, as will more fully appear from this specification, one form in which the invention may be embodied is described herein and illustrated in the accompanying drawing which is made a part hereof.

In the drawing:

FIG. 1 is a side elevation of the valve of the invention, a lever handle member being shown fragmentarily;

FIG. 2 is a top plan view of FIG. 1, the handle member being partly broken away;

FIG. 3 is an enlarged longitudinal vertical section on line 3—3 of FIG. 2;

FIG. 4 is a vertical transverse section on line 4—4 of FIG. 3;

FIG. 5 is a horizontal lateral transverse section on line 5—5 of FIG. 3, but with valve rotor turned 90°;

FIG. 6 is an enlarged fragmentary axially longitudinal vertical section of component parts of the valve seat assembly shown in FIGS. 3 and 5;

Figure 7:
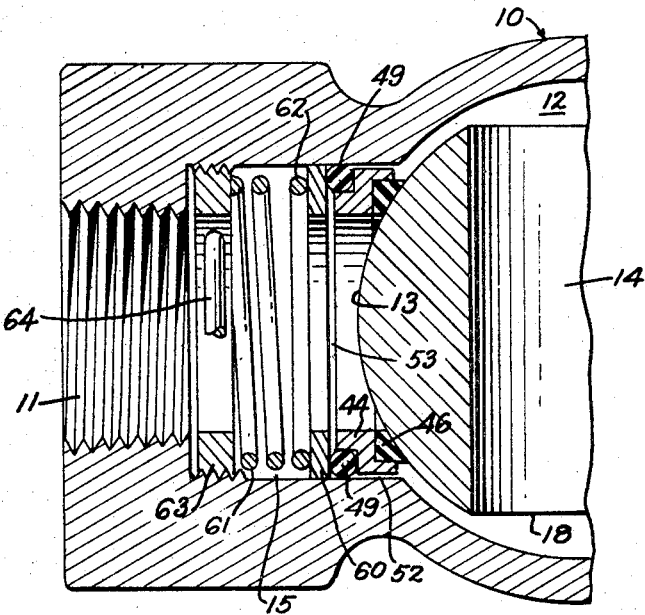
FIGS. 7 and 8 are fragmentary longitudinal lateral sections of modified forms of the invention.

Referring to the drawing in which like reference characters indicate corresponding parts in the several views of the exemplified forms of the invention, and referring firstly to FIGS. 1 to 6, an integral valve housing body member is generally indicated 10 which has threaded open ports or pipe conduit connections 11 therein at its oppositely disposed ends axial to the direction of the flow of fluids through the valve. The ports 11 communicate with a valve chamber 12 suitably formed within the housing to conveniently receive a rotor plug 13 which has a generally spherical body portion through which there is a tubular diametral bore or flow opening 14, the opposite ends of said opening removing truncated portions of the spherical body at the ends of the flow opening, as will be further described. In communication between the valve chamber 12 and each of the ported pipe connections 11 at axially opposite portions of the valve chamber is a cylindrical bore or recess 15, said recesses being axially alignable with the rotor flow opening 14 and with port openings 11, and being of greater diameter than flow opening 14, each recess being adapted for receiving a valve seat ring assembly or unit to be further described, and here generally designated 43.

The valve housing and its chamber 12 have an opening 16 at one wall which would normally be the upper wall when the valve rotor is rotated on a vertical axis, said opening being of sufficient size to receive therethrough all internal separate parts of the valve, and particularly being of lateral transverse diameter at 17 to receive therethrough the diameter of the spherical rotor, and of longitudinal dimension in the direction of flow through ports 11 sufficient to receive through said opening the lesser longitudinal diameter of the spherical rotor, at the truncated chord portions 18. The longitudinal ends of the top opening have transverse fillets 19 above which the opening is circular providing a circular recess 20 for receiving snugly therein an annular bead portion 21 which is a depending integral part of a closure plate or bonnet 22. The annular bead 21 is provided with groove-seated sealing gaskets 28 and 29 at its radially outer and inner walls.

The closure bonnet 22 is generally diamond shaped in plan and has a peripheral flange 23 which seats upon the upper wall of the housing at said top opening, the diamond shape extending longitudinally in direction of fluid flow and having its opposite end portions 24 overlying end portions of the upper face of the valve housing whereby bolts 25 may be mounted therethrough to tightly secure the closure bonnet to the body of the housing and thus tightly close said upper opening of the valve housing. Centrally the bonnet has a cylindrical bearing bore 26 therethrough which is surrounded by an outwardly extended integral circumferential collar 27 which is integral with closure member 22.

Within the housing at its lower wall opposite the bore 26 there is provided a cylindrical recessed bearing socket 30 which is coaxial with, and may be of the same diameter as, the bore 26, being preferably closed at its bottom and provided with an annular shoulder 31 in its side wall at its open end for receiving a sealing ring gasket 32 therein.

On the vertical axis of the spherical valve body 13 of the valve rotor there is an integral bearing shaft 33 extending oppositely from the spherical portion on a diameter normal to the axis of the flow opening 14, one portion 34 of the shaft being relatively shorter and rotatively fitting into the socket 30 and sealed by the sealing gasket 32 which is set on shoulder 31. The opposite end portion 36 of said shaft is relatively longer and extends rotatably through the tubular bore 26 and collar 27 of the closure cover 22, being sealed by gasket 29. Said outer end portion 36 of the shaft has an outer terminal end portion extending beyond the cover collar 27 and squared at 37 for engagement by a manipulating handle wrench 38. The outer terminal end of the said shaft is threaded at 39 to receive a washer and securing nut 40 by which the wrench handle may be removably secured to the shaft. It will be noted that the collar 27, as best shown in FIG. 2, has two abutment stops or extensions 41 at its circumference or periphery spaced relatively at 90 degrees. The handle wrench 38 has a lug 42 extending downwardly from its lower face which, when the handle is manipulated, is stopped by the abutments 41, whereby the rotor may be turned 90 degrees or one-fourth of a revolution which manifestly rotates the spherical rotor selectively between a position in which the tubular flow passage 14 communicates between the valve ports 11 and a position in which flow through the valve is interrupted by closing the recesses 15 and flow opening 11 responsive to the seating of the spherical portion of the rotor against valve seat assembly units or members 43 in each of the recesses 15.

The assemblies or units of valve seat-ring members which are generally indicated 43 provide floating and adjustable seats which are mounted slidable in the cylindrical recesses 15 at longitudinally opposite ends of the valve chamber 12 and adjacently spaced from each of the ported flow openings 11. The recesses 15 and the ring seat assembly members 43 are of less diameter than the opening 16 at the top of the housing whereby the seat members may be mounted in or removed from said recesses through said top opening prior to insertion of the rotor in the valve chamber, and the parts may be demounted by reversing that assembly procedure, so that the interior parts of the valve may be replaced or serviced without removal of the valve body from a conduit flow line.

Each seat assembly generally indicated 43 in FIGS. 1 to 6 comprises a pair of coaxial annular ring members which are relatively narrow in axial width and each of which is of generally planar form, the separate rings in each assembly having planar faces relatively confrontingly opposed. The internal diameters of the rings are preferably substantially similar to the diameter of flow opening 14 of the rotor. One of said ring members next adjacent to the valve chamber and the rotor therein is a base seat ring 44 having a circumferential face at its outer diameter which is of lesser diameter than the inner diameter of the bore, or recess 15, providing a circumferential space 52, such as, for example, in a valve having a flow bore 14 of 1¼ inch diameter, an effective space 52 may provide a minimum clearance difference of substantially 15 to 20 thousandths of an inch at each of the opposite ends of a diameter of the seat ring, that is, an effective minimum clearance provided by space 52 may be substantially 30 to 40 thousandths of an inch between the inner diameter of the recess bore 15 and the outer diameter of the circumference of the seat ring 44, and such exemplified O.D.–I.D. clearance may be beneficially increased to substantially 60 thousandths of an inch, especially in valves having greater flow capacity. This clearance space 52 is best illustrated in FIG. 6, wherein it is indicated that such a desirable clearance should provide for potential oscillation of the seat ring at an angle ranging between 1 and 8 degrees of inclination of the axis of the seat ring relative to the axis of the bore 15 in which the seat ring is mounted, as indicated by broken lines A—B in FIG. 6. Radially inwardly spaced from its outer circumference the seat ring 44 has an inset in its face which is adjacent to the valve chamber and thereby providing an annular recessed normal shoulder 45 at the radially inner circumferential edge of the seat ring, upon which shoulder is snugly and replaceably seated a sealing wear ring 46, so described to distinguish from a sealing gasket hereafter indicated 49. The sealing wear ring may be of suitably hard and rigid wear-resisting material such as neoprene, nylon, or an analogous substance on the commercial market known as Teflon (which may be a proprietary trade name). The sealing wear ring 46 has a sealing face 47 which faces the valve chamber 12, and, in transverse section, is angularly inclined forwardly and radially outwardly relative to the axis of the ring, and in use becoming conformed substantially to the arc of the wall of the rotor which seats thereagainst, providing an effective leakproof seal against the spherical wall of the rotor, and particularly around the end of the flow opening 14. The outer circumference of the wear ring 46 is preferably spaced radially inwardly from the outer circumference of the seat ring, and the inner circumferential edge portion of said wear ring extends radially inwardly to the internal diameter face of the base seat ring whereby there is sealing engagement against the spherical wall of the rotor at said inner circumferential edge of the ring, which prevents pressure of fluid flow being exerted or effective between the rotor and the sealing ring which might possibly force the sealing ring assembly out of sealing contact with the spherical wall of the rotor.

At its opposite face, or what may be termed its rearward or reverse face, the seat ring 44 has an inset annular shoulder 48 at its radially outer circumferential edge portion providing an annular right-angled semi-groove in which is snugly mounted a resilient sealing ring or gasket member 49. This sealing ring gasket 49 has a cross sectional diameter through its body sufficiently greater than the depth and width of the shoulder or semi-groove 48, so that the inner diameter of the gasket snugly fits and seals against the circumferential face of shoulder 48, and the outer diameter of the gasket snugly fits and seals against the inner circumference of the cylindrical bore or recess 15, thus resiliently supporting the seat ring 44 in spaced relation to the inner circumferential wall of recess 15, and thereby providing the space 52. This excess of cross-sectional diameter through the body of the sealing gasket 49 also extends the body of the gasket beyond the plane of the reverse face of the seat ring 44 and the inset shoulder 48 also decreasees the axial width of the circumferential face of the seat ring, which facilitates the tilting oscillation of the seat ring, as will be further described.

An annular backing ring 50 is adjustably mounted in the recess 15 as a part of the ring assembly generally indicated 43. The backing ring 50 has its forward face confrontingly opposed to the said reverse planar face of the seat ring 44. This backing ring 50 is preferably of an outer diameter snugly and slidably fitting the inner circumference of the recess 15 and is stabilized against casual rearward movement, as will be described. The forward face of the backing ring 50 is spaced from the reverse face of the seat ring by facial contact with the body of the sealing gasket 49, thus providing an annular space 53 between the confronting planar faces of the seat ring and backing ring, into which axial pressure of liquid in flow is exerted upon the reverse face of the seat ring 44 and effecting a radial pressure differential against sealing gasket 49 and thereby sealing the gasket proportionate to the pressure, and urging the seat ring and its sealing face 47 into sealing contact with the spherical surface of the rotor. The opposite or reversee face of the backing ring 50 is chamfered as at 51 so that the backing ring is irregularly triangular in transverse section through its body. It is to be noted that the sealing gasket 49 does not change its ring-supporting position responsive to flow pressure. It may change its cross-sectional shape due to varying pressures, but it always maintains its resilient supporting contact between the seat ring and the wall of recess 15.

To prevent casual rearward movement and for axial adjustment of the composite assembly of seat members, means are provided for stabilizing the backing ring 50 in constant pressure against the sealing gasket 49 and thereby exert a constant resilient pressure on the seat ring. In FIGS. 1 to 6 it will be noted that adjacently spaced from each of the ends of the housing there are threaded bores 55 axially aligned relatively through opposite side walls of the housing. These bores 55 which communicate with the cylindrical recesses 15 are more nearly adjacent to the outer ends of said recesses which are adjacent to the flow port opening 11, and are rearwardly of any usual position of backing ring 50. Within the bores 55 are mounted adjusting screws 56 having an adjusting nut 57 at the outer end and accessible from exterior of the housing, the inner end of the adjusting screws being conically tapered as at 58 and bearing against the chamfer 51 of the backing ring 50.

It is to be noted that the supporting of the seat ring 44 in spaced relation relative to both the circumferential wall of recess 15 and the backing ring 50 by means of the resilient gasket 49, as well as the consequent shortening of the axial width of the outer circumferential face of the seat ring, cojointly with the respective spaces 52 and 53, provides a resilient floating mounting for the seat ring, which permits the seat ring to rockingly oscillate in any direction on its axis and thus maintain its sealing seat by automatically following the surface of the rotor even though the rotor may be inadvertently out of a perfect axial alignment, and thus providing uniform sealing by the seat ring against the rotor at all pressures or under conditions of a vacuum suction.

In the exemplification of FIGS. 1 to 6 there are shown two oppositely disposed adjusting screws 56 at each seat recess 15 at the opposite ends of the valve chamber, but in relatively larger valves it is contemplated that four such adjusting screws may be employed at each end of the housing, in which event they would be relatively spaced at 90 degrees around the seat recess. In relatively larger sizes of valves it may also be advisable to substitute well-known cooperating end flange plates in place of the threaded openings 11 for mounting the valve in a flow line, both methods of such mounting being well known. If such end flanges are employed in such larger size valves, the mounting and dismounting of the valve is relatively simple and easy.

Figure 8:
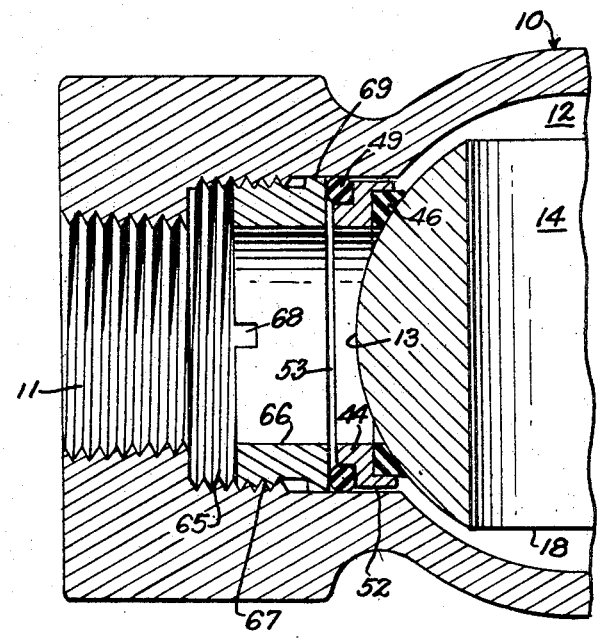

In FIGS. 7 and 8 modifications are shown in means for adjusting and maintaining pressure against the floating valve seat ring 44 relative to the rotor, one only of such means being shown in each modification, it being understood that a similar means is provided at each end of the valve chamber. In both FIG. 7 and FIG. 8 those elements which are identical with similar elements in FIGS. 1 to 6 are indicated by similar reference characters.

In FIG. 7 the means for maintaining the floating seat ring assembly in constant pressure contact with the rotor comprises an annular planar backing ring 60 snugly slidable at its outer circumference in recess 15 and having a forward face bearing against the sealing gasket 49 which latter maintains the seat ring in spaced relation to the backing ring and the wall of recess 15, thereby providing the spaces 52 and 53. A compressed coil spring 61 is mounted within the recess 15, one end of the spring seating with a complete circumferential coil 62 against backing ring 60 and having at its opposite end a ring bushing 63 threadedly mounted in recess 15 for adjustment of spring tension, the bushing being adjustable by means of a crossbar 64 across its diameter accessible through port 11.

In the modification of FIG. 8 the rearward end portion of the recess 15 is threaded as at 65 and the backing ring comprises a bushing 66 complementally threaded at its rearward end as at 67 to engage thread 65, and being threadably adjustable by means of notches 68 in its rear edge which are accessible to a suitable wrench through opening 11. The circumferential opposite or forward end portion 69 of the bushing is unthreaded and snugly and slidably fits the bore of recess 15, its forward face engaging the resilient sealing gasket 49 and applying pressure thereagainst to maintain the floating seat ring 44 in sealing contact with the rotor, and providing the spaces 52 and 53 between the seat ring and bushing and recess 15 respectively, as previously described.

It is to be further observed that all sealing gaskets described are preferably O-rings, which are a well-known form of gasket sealing means of a resistantly resilient and flexible material.

In operation the parts within the valve chamber 12 may be inserted and removed by removal of the cover bonnet 22, as described. The spherical rotor body is rotated on its rotative axis by the handle between open and closed positions of the bore 14, being stabilized on its rotative axis by mounting the integral shaft in bearings at opposite ends of a diameter normal to the flow opening 14. Having adjustable sealing means at each of the opposite ends of the flow bore, the valve does not depend on initial line pressure for initial sealing, and the sealing is positive at both ends of the rotor bore whereby the valve is equally efficient in either direction of flow. The sealing wear ring 46 of the base seat ring 44 contacts the spherical surface of the rotor and seals thereagainst at vacuum suction or at high or low fluid pressure responsive to pressure of the stabilizing backing rings 50, 60 and 66, against the resilient sealing gasket 49, the gasket 49 also providing a 3-point seal between the backing ring, the circumferential wall of recess 15 and the seat ring.

The seat ring being of lesser outer diameter than the inner diameter of recess 15 and providing space 52, the resilient sealing gasket 49 which has an inner diameter to snugly fit the circumference of the seat ring at shoulder 48 and a greater outer diameter than the seat ring and snugly fits the recess 15 thus supports the seat ring resiliently so that the seat ring may oscillate in its mounting whereby it may automatically adjust and conform its sealing face of the wear ring to a self-adjusted seat against the spherical wall of the rotor even at lowest liquid pressures, and thus accommodate the seal of the wear ring to any irregularities or deviations from perfection in operational normal alignment or in the mounting or surfacing of the spherical body. Similarly, the sealing gasket 49 has a cross section of body dimension to space the reverse or rear face of the seat ring 44 from the opposed face of the backing ring and thus provide the annular space 53 between said rings. At low flow pressure of fluid in the flow line, the backing ring exerts pressure contact on the sealing gasket 49 and thereby exerts sufficient pressure on the sealing seat ring to effectuate a sealing contact by the seat ring against the rotor; as well as the seal between the seat ring and the recess wall. Since the backing ring is stabilized against rearward movement, as fluid pressure builds up, such build-up or high pressure is exerted in space 53 and correspondingly increases the pressure and seal of the seat ring against the rotor body, and relaxes the pressure correspondingly when the fluid pressure is decreased. Such increase and decrease of fluid pressure is also effective on the sealing gasket 49 at the outer circumference of the space 53 and thereby spreads or flows the resilient body of the gasket material into respective greater or lesser sealing contact consonant with the increase or decrease of the pressure.

In each of the exemplifications of the invention, the means provided for maintaining the pressure of the backing ring against the sealing gasket maintains a constant sealing pressure on the gasket even at lowest fluid pressure. In FIGS. 1 to 6 this pressure of the backing ring is adjustable by the conical ends 58 of screws 56; in the modification of FIG. 7 the pressure is responsive to constant expansive pressure of the coil spring 61 and variable by bushing 63; and in FIG. 8 it is adjustable by the bushing 66.

Having thus described the invention, what is claimed as new and patentable is:

1. A flow valve for fluid comprising
   (a) a housing having therein a valve chamber and communicating flow ports connectible in a flow line for fluid,
   (b) said chamber having a cylindrical recess communicating with said ports,
   (c) a generally spherical rotor valve body rotatably mounted in the valve chamber and having a flow opening therethrough adapted for communicating between said recess and ports,
   (d) a bearing shaft means normal to the axis of the flow opening and rotatably mounting said rotor valve body on an axis of the shaft,
   (e) a valve seat assembly movable axially in said recess, (f) the valve seat assembly including a planar seat ring of sufficiently lesser diameter than said recess to provide a circumferential space between the seat ring and the wall of the recess, (g) the said seat ring having a sealing wear ring inset therein at the inner circumference of its front face confronting the rotor body for sealing thereagainst, (h) the said seat ring having an inset shoulder at the outer circumference of its opposite reverse face, (i) an annular resilient sealing gasket mounted snugly circumferentially of said shoulder and having its body extending radially beyond the outer circumference of the seat ring and sealingly engaging the wall of said recess whereby the seat ring is resiliently supported sufficiently loosely in the recess whereby the seat ring may rockingly oscillate on its axis, (j) the said sealing gasket extending axially beyond said opposite reverse face of the seat ring, (k) an annular backing ring mounted slidably axially in said recess at said reverse face of the seat ring, (l) said backing ring having its forward face adapted for contact with the said axially extended body portion of said sealing gasket and being thereby spaced from the reverse face of the seat ring, (m) and means for adjustably maintaining said backing ring in axial pressure against said sealing gasket.

2. A rotor valve as set forth in claim 1, (a) the said valve housing having a closable opening at a wall thereof of sufficient size to receive the rotor and said seat assembly members therethrough, (b) a removable closure member for said opening having a shaft-bearing bore therethrough, (c) a shaft socket opening into the valve chamber opposite said closure bore, (d) the shaft being integral with the rotor and extending oppositely therefrom on an axis perpendicular to the flow opening, the opposite end portions of the shaft being rotatably mounted in the respective bore and socket, (e) resilient sealing gaskets between the respective rotor and shaft members and the respective socket and bore, (f) the resilient mounting of the seat ring in spaced relation to the said recess of the valve housing cooperating with the last mentioned resilient sealing gaskets whereby the seat ring may follow and remain in sealing contact with the face of the rotor upon any deviation of the rotor from the normal axial alignment thereof responsive to vibratoin of the rotor body in said sealing gaskets for the socket and bore.

3. A flow valve for fluid as set forth in claim 1 and in which the seat ring and the backing ring are confrontingly opposed in spaced relation.

(a) and the resilient sealing gasket therebetween is circumferential of the space between the seat ring and backing ring and thereby subject to the fluid pressure in said space between said rings.

4. A rotor valve of the character described as set forth in claim 1, and in which the said last mentioned adjustably-maintaining-means includes a threaded portion of the inner circumferential wall of the recess and complemental engaging threads on the backing ring.

5. A rotor valve as set forth in claim 1, the said last mentioned adjustable-maintaining-means including an expansively tensioned coil spring bearing on the reverse face of the backing ring.

6. In a rotor valve which includes a housing having a valve chamber and flow ports oppositely axially aligned therein and connectible in a flow line for fluids, (a) said housing having oppositely disposed cylindrical seat recesses axially aligned and communicating between the valve chamber and the flow ports, (b) a spherical rotor valve member rotatable in the valve chamber having a flow opening through a truncated portion for communicating between said ports, (c) a valve seat assembly in each of said recesses including a seat ring and a backing ring which are relatively confrontingly opposed and axially spaced, (d) said seat ring having a forward face confronting the rotor for sealing thereagainst, said seat ring being of lesser outer diameter than the inner diameter of the recess providing a mounting therein sufficiently loosely to permit the seat ring to rockingly oscillate on its axis relative to the recess, (e) the said seat ring having an inset shoulder at the outer circumference of the opposite rearward face of the seat ring, (f) an annular resilient sealin ggasket mounted circumferentially of said shoulder and having its body extending radially beyond the outer circumference of the seat ring and sealingly engaging the wall of said recess and thereby resiliently supporting the seat ring in spaced relation to the recess wall, (g) and the said sealing gasket extending axially beyond the opposite rearward face of the seat ring, and said annular backing ring being mounted axially slidable at said reverse face of the seat ring.

(h) the backing ring having its forward face in contact with the said axially extending body portion of said sealing gasket and thereby being spaced from the reverse face of the seat ring, (i) and means for adjustably maintaining said backing ring in axial pressure contact with said sealing gasket.

7. A flow valve for fluids as set forth in claim 6, (a) the axial width of the outer circumferential face of the seat ring being decreased by said shoulder to less than the axial width of the seat ring for facilitating rocking oscillation of the seat ring in said recess.

References Cited in the file of this patent
UNITED STATES PATENTS

| | | |
|---|---|---|
| 494,569 | Howell | Apr. 4, 1893 |
| 1,954,018 | Miller | Apr. 10, 1934 |
| 2,392,198 | Snyder | Jan. 1, 1946 |
| 2,480,529 | Waag | Aug. 30, 1949 |
| 2,886,282 | Miller | May 12, 1959 |
| 2,890,017 | Shafer | June 9, 1959 |
| 2,916,254 | Wendell | Dec. 8, 1959 |